United States Patent [19]
Whiteley et al.

[11] Patent Number: 5,716,521
[45] Date of Patent: Feb. 10, 1998

[54] RECHARGEABLE FILTER

[75] Inventors: Simon Whiteley, Hastings; Simeon Charles Jupp, Leicester, both of England

[73] Assignee: U.S. Philips Corporation, New York, N.Y.

[21] Appl. No.: 649,404

[22] Filed: May 17, 1996

[30] Foreign Application Priority Data

May 19, 1995 [GB] United Kingdom .................. 9510149

[51] Int. Cl.$^6$ .................................................. B01D 29/62
[52] U.S. Cl. .................. 210/266; 210/283; 210/493.5; 210/494.2; 210/499
[58] Field of Search .................. 55/385.4, 525, 55/DIG. 30, DIG. 31, DIG. 35, DIG. 45, 517, 521; 210/494.1, 497.1, 497.2, 497.3, 499, 493.5, 266, 283

[56] References Cited

U.S. PATENT DOCUMENTS

| | | | |
|---|---|---|---|
| 1,843,446 | 2/1932 | Drager | 55/517 |
| 3,413,782 | 12/1968 | Bartlett | 210/494.1 |
| 4,902,306 | 2/1990 | Burnett et al. | 55/DIG. 45 |
| 5,250,094 | 10/1993 | Chung et al. | 55/DIG. 30 |
| 5,470,364 | 11/1995 | Adiletta | 55/DIG. 30 |
| 5,512,172 | 4/1996 | Marble | 210/493.1 |
| 5,531,892 | 7/1996 | Duffy | 210/493.1 |

*Primary Examiner*—W. L. Walker
*Attorney, Agent, or Firm*—Ernestine C. Bartlett

[57] ABSTRACT

A rechargeable filter comprises first and second spaced particle-retaining meshes in which the first mesh (64) is continuous and forms a series of "V" shapes, and the second mesh comprises a number of closed "V"-shaped mesh elements (68), each second mesh element projecting into one "V" of the first mesh. The meshes are spaced at a constant distance by rigid projections (70) which also laterally space the upper parts (72) of the second mesh elements so that particles of filter material (74) can be loaded and unloaded.

16 Claims, 4 Drawing Sheets

RECHARGEABLE FILTER

FIELD OF THE INVENTION

This invention relates to a filter containing particulate material, especially a filter for removing odors, gases or chemicals from a fluid flowing through it.

BACKGROUND OF THE INVENTION

It is known to provide a filter comprising granules of activated carbon or other filter material contained within a fabric mesh, but such filters are expensive to replace. Also, filters are most effective when the layer of filter material is of constant thickness, which is not easily achieved with a fabric container, unless the container is flat, when it is also bulky.

SUMMARY OF THE INVENTION

It is an object of the invention to provide a rechargeable filter which can be charged with filter material in particulate form, such as granules of activated carbon, and which is compact in shape.

According to the invention, a rechargeable filter comprises first and second spaced particle-retaining meshes in which the first mesh is continuous and undulatory in cross section perpendicular to the mesh; and the second mesh comprises a plurality of mesh elements forming closed figures in cross section perpendicular to the mesh, each second mesh element projecting at least partially into one undulation of the first mesh.

Preferably the second mesh elements are shaped and positioned within the undulations of the first mesh so that the spacing between the first and second meshes is constant.

Optionally the undulations of the first mesh and the closed figures of the second mesh are substantially V-shaped.

Preferably the upper parts of the second mesh elements are laterally spaced to provide apertures through which particulate filter material may be loaded or unloaded.

Preferably there are provided a plurality of rigid spacing means between the first and second mesh elements to provide constant spacing of the meshes where the second elements project into the undulations of the first mesh. In one arrangement the spacing means comprises projections on a first support frame to which the first mesh is attached, and the second mesh elements are attached to a second support frame which also provides lateral spacing of the elements.

Alternatively the spacing means are provided on the V-shaped faces of the second mesh elements, the spacing means being of such thickness that the upper parts of the elements are laterally spaced.

The particles of filter material may be activated carbon, impregnated activated carbon, or any other particulate medium capable of removing gases, odours, or chemicals from fluid passing through the medium.

Also according to the invention a filter device comprises inlet means; a rechargeable filter comprising first and second spaced particle-retaining meshes in which the first mesh is continuous and undulating in cross section perpendicular to the mesh and the second mesh comprises a plurality of mesh elements forming closed figures in cross section perpendicular to the mesh, each second mesh element projecting at least partially into one undulation of the first mesh; flow means; and outlet means; the flow means being arranged to cause a fluid to flow from the inlet means sequentially through the first mesh, any particles of filter material between the meshes, and the second mesh, to the outlet means. Usually the fluid will be a gas such as air, but alternatively a liquid filter device may be provided.

It is an advantage of a rechargeable filter according to the invention that the space between the meshes can be filled with particulate filter material quickly and easily, and that the particles can be replaced when exhausted. This allows a relatively inexpensive filter to be provided. The V-shape of the space allows the filter to be compact while providing a substantial filter surface area.

BRIEF DESCRIPTION OF THE DRAWINGS

The invention will now be described by way of example only with reference to the accompanying drawings in which.

DETAILED DESCRIPTION OF THE PREFERRED EMBODIMENTS

Figure 1:
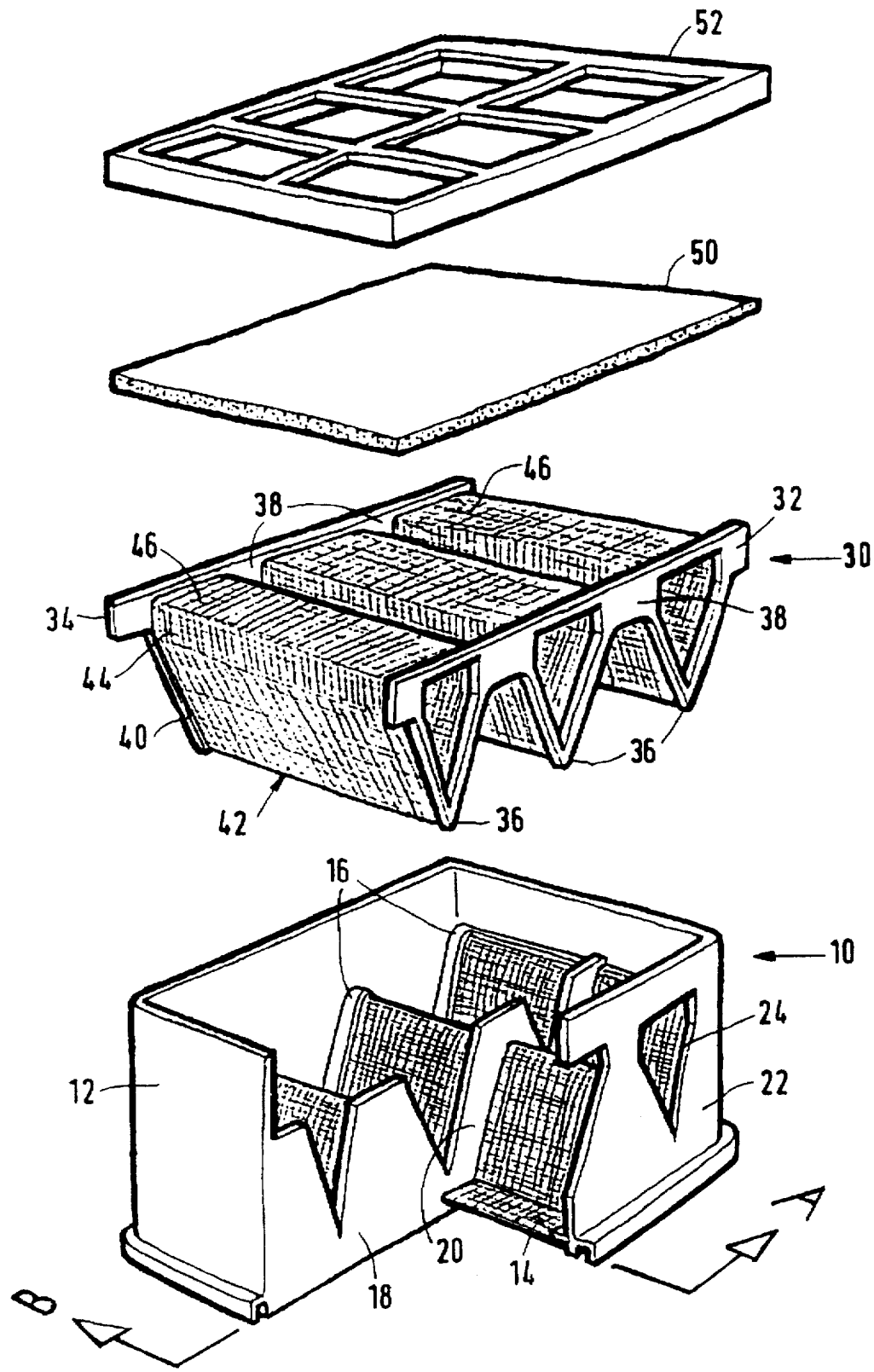
FIG. 1 is an exploded view of a first embodiment of a rechargeable filter according to the invention.

In FIG. 1, the main body 10 of a filter comprises a rigid shell 12 of rectangular cross section through which air is drawn upwards in use.

The lower surface of the filter is formed by a continuous fabric mesh 14 arranged to form a series of V-shaped undulations by V-shaped supports 16,18 at the sides and across the center of the body 10 respectively. The central support 18 also has a series of V-shaped grooves in its upper edge at a constant height above the mesh 14 to act as spacers 20.

In one side wall 22 of the body 10 there are a number of V-shaped apertures 24 corresponding to the V-shaped undulations of the mesh 14; only one aperture is visible in the partially-cutaway view of FIG. 1.

Shown spaced above the main body 10 is an exhaust body frame 30 having two parallel supports 32,34 of such length as to just fit into the shell 12. The supports carry three open-ended V-shaped frames 36 separated at their upper edges by lateral spacers 38.

Each frame 36 supports a mesh 40 arranged to form a substantially V-shaped element 42. The upper parts of each element 42 have vertical walls 44 which are held in lateral separation by the lateral spacers 38. All of the elements have closed upper surfaces 46 so that the meshes 40 are continuous around each V-shape.

When the exhaust body 30 is inserted into the main body 10, the lower parts of the mesh elements 42 project partially into the undulations of the lower mesh 14; the two layers of mesh are equispaced by the spacers 20. The open ends of the V frames 36 correspond with the apertures 24 in the sidewall 22 and form exhaust apertures.

Between the two layers of V-shaped meshes 14,40 there is an undulating gap of constant thickness, set by the height of the spacers 20, and accessible through the lateral spacing between elements 42 at the upper, vertical parts 44. If granular carbon is poured into the gap, the granules will lie in a constant-thickness layer between the meshes.

Above the elements 42 are a flexible foam pad 50, and a snap-on lid 52, which when in place apply pressure to the granules to hold them to allow easy transport of the filter, and also compensate for any settling of the granules.

Figure 2:
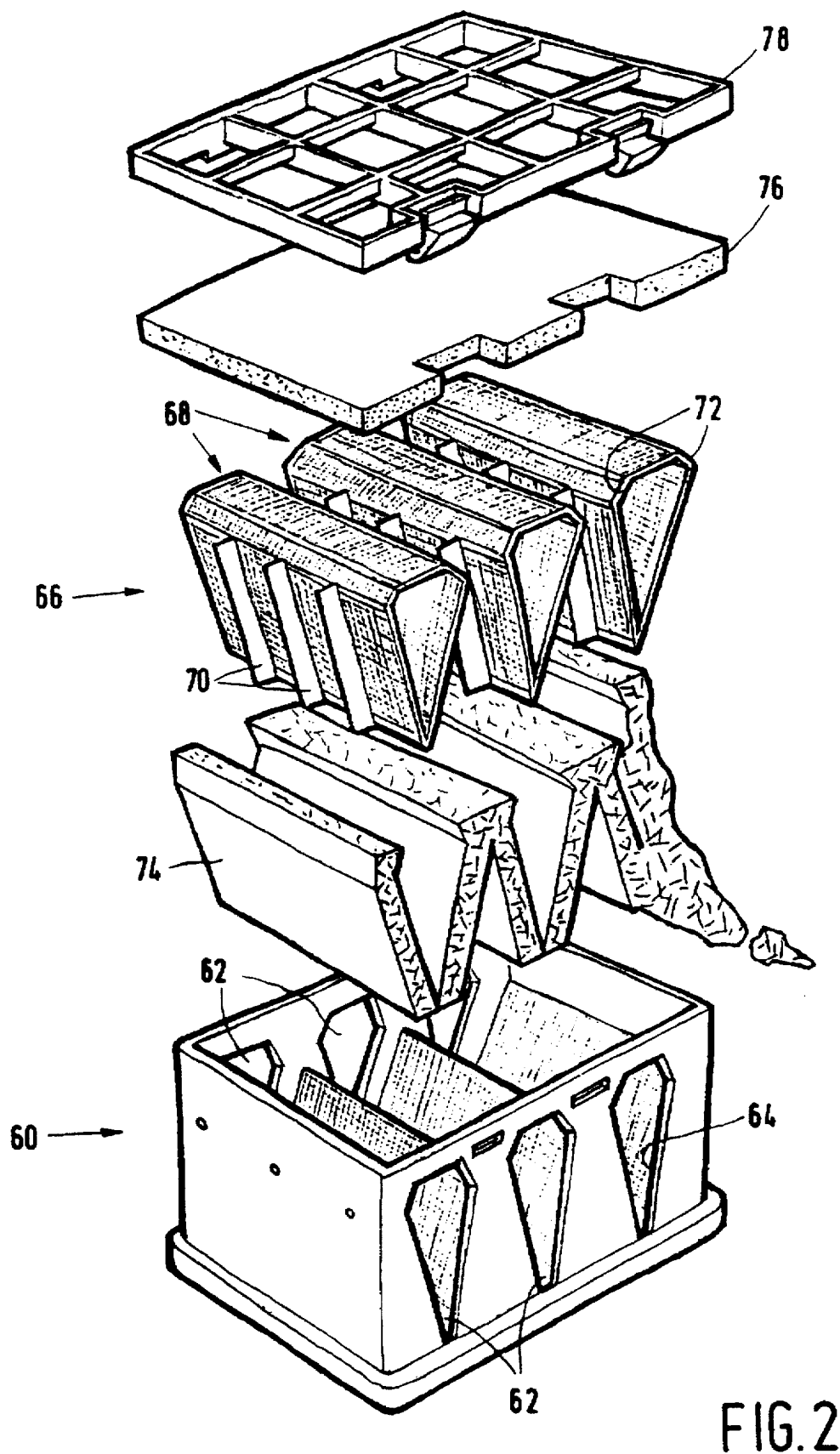
FIG. 2 is an exploded view of an alternative embodiment of a rechargeable filter showing the shape taken up by the granular filter material.

FIG. 2 shows another embodiment of the filter comprising a rigid shell 60 having substantially V-shaped apertures 62 in opposite sidewalls, and a continuous undulatory V-shaped first mesh 64. An exhaust body 66 comprises a number of separate substantially V-shaped mesh elements 68 each having an internal V-shaped frame (not visible), the external V-shaped faces of the elements carrying a number of rigid spacing fins 70 projecting at right angles to the mesh. The upper parts of each element form a pair of inwardly-sloping shoulders 72.

When the separate elements 68 are placed within the undulations of the lower mesh 64, the fins 70 support the elements 68 and provide constant spacing between the meshes, and a lateral spacing between the shoulders 72 of adjacent elements.

The shape of the space between the meshes, and therefore the shape taken up by the granules, is shown at reference 74. Effectively the granules lie in a number of flat slabs forming a pleated shape, similar to the pleats in pleated paper filters. It can be seen that if air passes through the lower mesh, through the granule layer, and out through mesh elements 68 to exhaust apertures 62, the air will pass through a constant thickness of carbon. This is the most effective mode of operation of a filter.

The filter of FIG. 2 also has a layer of foam 76 and a snap-on lid 78.

It is an advantage of a filter according to the invention that the carbon granules can be replaced when exhausted, simply by removing the lid and pad, pouring the granules out, and adding new granules.

It has been found that if the spacing between the first and second meshes is arranged so that the thickness of the carbon granule layer is 10 times the largest dimension of the granules, the risk of the granules forming bridges across the elements 34 or 68 is minimized.

If the granules of activated carbon are NORIT RB2, then a 10 millimeters thick slab is indicated by the particle size. This thickness when used in a room filter has been found to give a perceived reduction of the odor of cigarettes.

It is known that in any filter, a maximum volume of filter material gives maximum filter life, while a minumum pressure drop for a given fluid flow rate is required to permit reasonable power demand; pressure drop depends on the thickness of the layer of filter material and on the particle size.

The pressure drop across a filter has two components, the constructional pressure drop caused by the filter shape differing from a flat layer, and the media pressure drop, caused by the filter medium, i.e., activated carbon granules in the example of the current invention.

Figure 3:
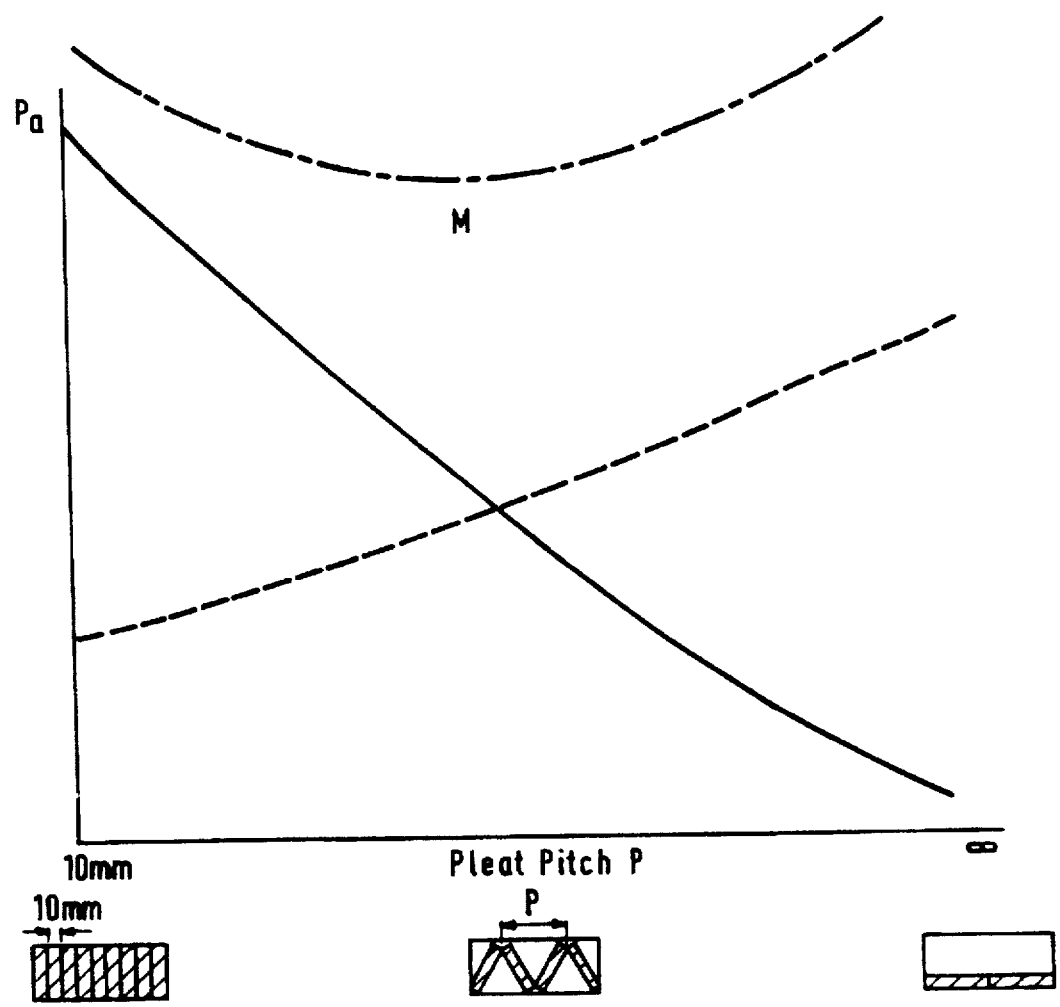
FIG. 3 illustrates the effect of pleat pitch variation.

FIG. 3 illustrates the effect of varying the "pleat pitch", ie the separation between the slabs of granules shown at reference 74 in FIG. 2; FIG. 3 is a plot of the pressure drop Pa across the filter against the pleat pitch of the slabs of granules. The pleat pitch is illustrated in the schematic drawings below the graph; if the slabs are 10 millimeters thick, the pitch varies from 10 mm, when the thickness of the filter is equal to the length of the slabs as shown in the left-hand sketch, to infinity when the slabs are flat as shown in the right-hand sketch. The central sketch shows an intermediate pitch, corresponding to the arrangement in FIG. 2.

For a constant flow rate of air the constructional pressure drop, as shown by the full line, decreases from a substantial to a very low value as the pleat pitch increases. The dotted line shows the effect on the media pressure drop, which increases from a non-zero value to a high value. The total pressure drop is shown by the chain-dotted line, and has a shallow central minimum M.

For a 10 mm slab of NORIT RB2 carbon, the minimum M occurs at a pleat pitch of between 40 and 50 mm. This pitch optimize the use of the available volume within the filter body.

By selection of other variables including type, grade, and granule size of the carbon as well as slab thickness and pitch, filter characteristics can be varied in accordance with the required application, efficiency, and lifetime, always retaining the overall compact shape of the "V" shaped slabs, and the advantage of a replaceable particulate filter material.

Figure 4:
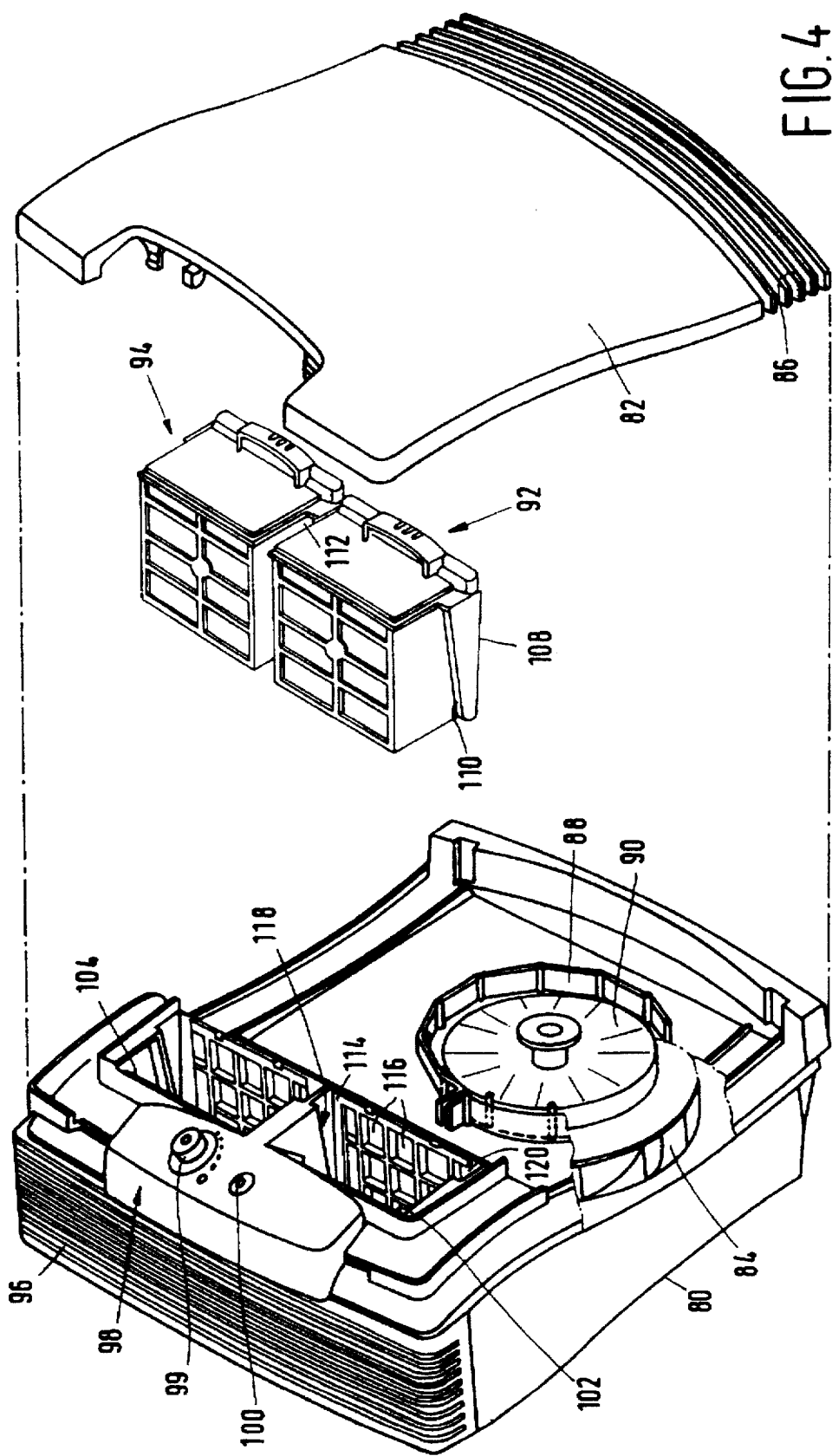
FIG. 4 illustrates a filter device containing a rechargeable filter.

The filter according to the invention may be used as the replaceable filter element in a filter device such as an air cleaner as described in our copending United Kingdom Patent Application No. 9507450.6 filed on 11 Apr. 1995, and which is illustrated in FIG. 4.

The air cleaner comprises a casing 80 and front cover 82. A motor driven fan 84 draws air through an inlet grill 86 in the cover 82, through a flexible strip prefilter 88 ( which removes hairs and the like), and through a rotary particle separator 90 which rotates with the fan. Air then passes upwards in the casing and through twin removable filter bodies 92,94, each of which may be a rechargeable filter as illustrated in FIG. 1 or FIG. 2. The air then passes to an outlet grille 96 in the casing 80.

The cleaner also has a control panel 98 carrying a control knob 99 and an indicator light 100.

The removable, rechargeable filter bodies 92,94 are slidable within corresponding apertures 102, 104 in the casing below the control panel.

The filter body 92 has around its lower edge a resilient seal 108. The body also carries adjacent to its lower edge a pair of guide surfaces 110,112 which lie at a small angle to the lower edges. The filter body 94 is identical.

The casing aperture 102 is provided with a filter support face 114 having a plurality of apertures 116, and a pair of guide surfaces 118,120, which lie above and at a small angle to the filter support face. Aperture 104 is identical.

The small angles associated with the guide surfaces on the filter bodies and on the casing are identical, and are typically 7½ degrees.

When the filter body 92 is inserted into the aperture 102, the seal 108 slides on the support face 114; towards the end of the sliding movement the guide surfaces on the filter body 110,112 and on the casing 118,120 come into contact and, as the filter is further inserted, the resilient seal is pressed against the face to provide a substantially air-tight join.

The filter bodies are easily removed from the casing to allow them to be recharged with filter material.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention.

We claim:

1. A rechargeable filter containing filter material in particulate form and which comprises first and second spaced particle-retaining meshes in which the first mesh is continuous and undulating in cross section perpendicular to the mesh; and the second mesh comprises a plurality of mesh elements forming closed figures in cross section perpendicular to the mesh, each second mesh element projecting at least partially into one undulation of the first mesh.

2. A rechargeable filter according to claim 1 in which the second mesh elements are shaped and positioned within the undulations of the first mesh so that the spacing between the first and second meshes is constant.

3. A rechargeable filter according to claim 2 in which the undulations of the first mesh and the closed figures of the second mesh elements are substantially V-shaped.

4. A rechargeable filter according to claim 3, in which the upper parts of the second mesh elements are laterally spaced to provide apertures through which particulate filter material may be loaded or unloaded.

5. A rechargeable filter according to claim 3, in which a plurality of rigid spacing means are provided between the first and second mesh elements to provide constant spacing of the meshes where the second elements project into the undulations of the first mesh.

6. A rechargeable filter according to claim 2, in which the upper parts of the second mesh elements are laterally spaced to provide apertures through which particulate filter material may be loaded or unloaded.

7. A rechargeable filter according to claim 2, in which a plurality of rigid spacing means are provided between the first and second mesh elements to provide constant spacing of the meshes where the second elements project into the undulations of the first mesh.

8. A rechargeable filter according to claim 1 in which a plurality of rigid spacing means are provided between the first and second mesh elements to provide constant spacing of the meshes where the second elements project into the undulations of the first mesh.

9. A rechargeable filter according to claim 8 in which the spacing means comprises projections on a first support frame to which the first mesh is attached.

10. A rechargeable filter according to claim 9 in which the second mesh elements are attached to a second support frame which also provides lateral spacing of the elements.

11. A rechargeable filter according to claim 8 in which the spacing means are provided on the V-shaped faces of the second mesh elements, the spacing means being of such thickness that the upper parts of the elements are laterally spaced.

12. A rechargeable filter according to claim 1 in which the upper parts of the second mesh elements are laterally spaced to provide apertures through which particulate filter material may be loaded or unloaded.

13. A rechargeable filter according to claim 12, in which a plurality of rigid spacing means are provided between the first and second mesh elements to provide constant spacing of the meshes where the second elements project into the undulations of the first mesh.

14. A filter device comprising inlet means; a rechargeable filter containing filter material in particulate form and comprising first and second spaced particle-retaining meshes in which the first mesh is continuous and undulating in cross section perpendicular to the mesh; and the second mesh comprises a plurality of mesh elements forming closed figures in cross section perpendicular to the mesh, each second mesh element projecting at least partially into one undulation of the first mesh; flow means; and outlet means; the flow means being arranged to cause a fluid to flow from the inlet means sequentially through the first mesh, through any particles of filter material between the first and second meshes, and through the second mesh, to the outlet means.

15. A rechargeable filter containing filter material in particulate form and which comprises first and second spaced particle-retaining meshes in which the first mesh is continuous and undulating in cross section perpendicular to the mesh; and the second mesh comprises a plurality of mesh elements forming closed figures in cross section perpendicular to the mesh, each second mesh element projecting at least partially into one undulation of the first mesh, wherein the filter material in particle form is filled into space between the first and second meshes and is replaceable as needed.

16. A filter device comprising inlet means; a rechargeable filter containing filter material in particulate form and comprising first and second spaced particle-retaining meshes in which the first mesh is continuous and undulating in cross section perpendicular to the mesh; and the second mesh comprises a plurality of mesh elements forming closed figures in cross section perpendicular to the mesh, each second mesh element projecting at least partially into one undulation of the first mesh; flow means; and outlet means; the flow means being arranged to cause a fluid to flow from the inlet means sequentially through the first mesh, through any particles of filter material between the first and second meshes, and through the second mesh, to the outlet means, wherein the filter material in particle form is filled into space between the first and second meshes and is replaceable as needed.

* * * * *